Patented Aug. 8, 1939

2,169,195

UNITED STATES PATENT OFFICE 2,169,195

PRODUCTION OF VITAMIN A ESTERS

Kenneth C. D. Hickman and Arthur O. Tischer, Rochester, N. Y., assignors, by mesne assignments, to Distillation Products, Inc., Rochester, N. Y., a corporation of Delaware No Drawing. Application December 28, 1935, Serial No. 56,587

17 Claims. (Cl. 260—410)

This invention relates to the preparation of vitamin A concentrates and particularly to the preparation of concentrates containing the vitamin A substantially in the ester form.

Concentrates available at the present time are produced by saponification of vitamin containing oils such as fish oils, separation of the unsaponifiable portion and recovery of the vitamin therefrom. Our researches have shown that vitamin A present in natural oils such as fish oils is in the form of an ester and that the saponification treatment outlined converts the ester into an alcohol. We have found that the alcohol form is much more subject to oxidation than the ester form and, therefore, cannot be stored or marketed without considerable loss in potency even after involved precautions against such loss have been taken.

There are still other objections to concentrates containing the alcohol of vitamin A. The odoriferous materials present in the fish oils are simultaneously concentrated with the alcohol so that the concentrate obtained is of a highly odoriferous nature, unsatisfactory for administration unless capsules are used. There is furthermore considerable medical authority for the view that the natural vitamin A of fish oils is superior for therapeutic results to the vitamin A concentrates obtained by the saponification treatment outlined above. The difference between the two forms being merely that one is an ester and the other an alcohol would indicate that the ester form is superior because it is more easily or completely assimilated. It appears probable that the alcohol form must on administration be converted by the body into an ester before it can be utilized.

High vacuum distillation of animal oils to concentrate the vitamin content thereof is disclosed in U. S. Patent 1,925,559. The vitamin A is obtained as a distillate of considerable purity and substantially free of odor. As the vitamin is not materially changed in the process it is present in the distillate mostly in the ester form and such concentrates have much better keeping qualities than the alcohol concentrates previously prepared. However, it has been found that certain fractions of the concentrate thus obtained consist largely of the vitamin A alcohol and that this portion is rapidly lost on standing in the same manner that the concentrates obtained by saponification lose their potency. The occurrence of vitamin A alcohol in the distillate is probably due to hydrolysis of the ester form in the fish oil prior to distillation, although it is possible that slight pyrolysis during distillation is at least partially responsible.

The present invention has for its object to prepare concentrates which contain the vitamin A in the ester form substantially exclusively. Another object is to prepare a vitamin A concentrate having improved keeping qualities. A further object is to provide a process for producing concentrates having the above desirable qualities. A still further object is to provide a distillate of molecular distillation which contains vitamin A substantially in the ester form. Another object is to provide vitamin A concentrates having improved therapeutic value and which are more easily and completely utilized by the animal body. A further object is to provide esters of chosen acids or mixture of acids. Other objects will appear hereinafter.

These objects are accomplished by the following invention which in its broader aspects comprises the molecular distillation of animal oils containing vitamin A and esterification of the vitamin A-alcohol content of the concentrate. While any acyl radicle may be introduced such as oleyl, acetyl, palmityl, etc., we prefer to introduce one which is unsaturated.

In the following examples and description we have set forth several of the preferred embodiments of our invention, but it is to be understood that they are included merely for the purpose of illustration and not as a limitation thereof.

In carrying out our invention the animal or other oil containing vitamin A is subjected to molecular distillation and the concentrate thus obtained subjected to esterification treatment to produce a concentrate having the vitamin substantially completely in the ester form.

Convenient apparatus for carrying out the molecular distillation of substances containing vitamin A is described in U. S. Patent 1,942,858. It is apparent, however, that other types of molecular distillation apparatus may be used. Oils absorb large volumes of gas and contain considerable amounts of volatile materials and it is, therefore, desirable to subject the material to be distilled to a degassing treatment of the nature disclosed in the patent referred to. However, if desired the oil may be directly run into the distilling chamber and gas removed therein.

The particular pressure of residual gas, temperature and distance separating distilling and condensing surface, are within limits specified below, largely a matter of expediency and operating convenience. We employ a disposition of temperature, pressure, and distance that approximates the condition of molecular distillation. For the ideal application of this condition the condensing surface is placed facing the distilling surface of the hot oil and every molecule of residual gas is removed so that there is a clear and uninterrupted path available for molecules of oil evaporating and passing to the condensing surface. Under these conditions the oil can transfer at the lowest possible temperature. It is not, however, possible to remove every interfering molecule, nor is it commercially desirable to remove more than the minimum number necessary to secure sufficiently unhindered distillation. If the rate of distillation in a perfect vacuum is taken as 100° C. then the rate will be diminished to about 50% in a vacuum where the molecules of residual gas have a mean free path equal to the distance separating the distilling and condensing surfaces. The degree of vacuum and the distance of free path are directly proportional. With a pressure ten times lower and a mean path ten times longer than the distance between the surfaces, the hindrance to distillation is negligible. On the other hand, a pressure five times greater and a free path one fifth of the distance separating the two surfaces depresses distillation to about 1%. It is difficult to define the exact pressure-distance relation at which molecular distillation ceases, but for practical purposes it may be defined as where the distance is double the free path.

The mean free path of a molecule in air at room temperature is about 2½ inches at 1 micron pressure. The path varies according to the temperature, and the molecular character, but an oil molecule may be considered to have a mean free path of approximately 2 inches in a residual atmosphere of air at 1 micron at the temperature of distillation. We, therefore, contemplate using evaporating and condensing surfaces situated within 1 inch at residual operating pressure of less than 3 microns, or within ten inches at less than 3 microns and so on. With pressure and distance as interchangeable quantities in molecular distillation, we are able to place no real lower limit to the pressure or upper limit to the distance, but for reasons of expediency we prefer not to operate with a residual pressure of less than .01 micron or a distance of more than 10 ft. In determining the high pressure limit we have been unable to separate at reasonable speed or without undue loss of even the most volatile of the desired material at pressures greater than .1 mm. nor use without danger of contamination, distance between distilling and condensing surfaces less than .1 inch. Pressure below .01 mm. and preferably in the neighborhood of about .001 mm. have been found to be most desirable.

There is yet another aspect of the pressure-temperature-distance relation which must be considered in the operation of a molecular distillation process. It has been shown for instance that when the pressure of residual gas reduces the mean free path to $\frac{1}{5}$ the distilling distance the rate of distillation is diminished to $\frac{1}{100}$. In an example, the pressure of this residual gas may be taken as 5 microns. If now the temperature of the material under treatment be raised until the saturation pressure of the vapor is greater than 5 microns, then all the residual gas will be driven from the still and distillation will proceed at the high rate characteristic of a vapor stream of 5 microns density. A condition of accelerated molecular distillation will supervene in which the essential requirement to wit, the absence of substantially all interfering gas, has been met, yet the residual gas in the vacuum manifolds and measuring devices will exert a pressure of 5 microns and will suggest that a condition of molecular distillation does not exist when in fact, it does.

It is a well known characteristic of distillation processes that a sharp cut cannot be obtained unless efficient fractionating means are employed. Efficient fractionation under molecular conditions is not at present possible so that the removal of a single compound from a mixture is difficult. Redistillation affords a purer fraction, but is usually uneconomical or unnecessary for the purposes to which the vitamin will be put. For the above reasons the vitamin A alcohol distills at least in part with the higher boiling ester. Also if thermal decomposition is responsible for the presence of the alcohol it is conceivable that the decomposition takes place between the interval that the vitamin ester leaves the vaporizing surface and arrives at the condensing surface. In such a case, no amount of fractionation would give a product free of the alcohol. It has been found that a material amount of the alcohol form can be separated at about 90°–110° C. and it is especially desirable to esterify this fraction. The ester form comes over in major amounts at 160°–180° C. Distillation may be carried out to give several fractions and each one esterified or the entire vitamin A content of the oil may be removed as a single fraction and esterified. Vitamin A may be distilled under molecular conditions at temperatures between 70° and 300° C. although lower temperatures between 70° and 250° C. and particularly temperatures of 90° to 220° C. have been found to be more satisfactory.

The vitamin A containing fractions are removed from the still and subjected to esterification in the manner set forth in the following examples. Any acyl radicle may be introduced such as those of benzoic, succinic, palmitic, stearic, acetic, crotonic, angelic, oleic, linoleic, linolenic, erucic, etc. acids. The high molecular weight aliphatic acids and especially those which are unsaturated are preferred. The esterification rate may be improved by the use of esterification catalysts and the acid halides, anhydrides or oher acyl derivatives may be employed as the esterification agent.

As set forth above we prefer to employ unsaturated aliphatic acids and preferably those having a high molecular weight such as for instance above 8 carbon atoms. It is our experience that the esters of the saturated acids and especially those of low molecular weight are of considerably less therapeutic value than the esters of unsaturated aliphatic acids. The saturated esters are assimilated at a slow rate and are apparently excreted or destroyed by digestive action before complete utilization can take place. This is possibly due to the fact that the saturated esters must be broken down in the animal body and unsaturated esters must be synthesized by the organism before the vitamin can be utilized. Instead of using a single acid several of different types may be used. A convenient esterification mixture may be obtained by hydrolysis of a highly unsaturated vegetable or animal oil and conversion of the mixture of acids thus obtained into the acid halides or other form for esterification. While it is preferred that the acids be entirely unsaturated such a mixture may contain some saturated acids without materially affecting the characteristics of the vitamin ester. Examples of oils which may be used as a source of the unsaturated acids are: corn, linseed, whale, menhaden, walnut and olive oils.

The feature of employing unsaturated acids may also be applied to the esterification of vitamin A alcohol concentrates produced by other means such as saponification of fish oils and separation of the vitamin A alcohol according to the methods of the prior art. Furthermore as the natural esters are mostly those of saturated acids it is often desirable to saponify the molecular distillate, separate the unsaponifiable which is mostly vitamin A alcohol and re-esterify it with the high molecular weight unsaturated aliphatic acids. The following examples illustrates the esterification of vitamin A concentrates.

Example 1

100 grams of a vitamin A concentrate having 3,500,000 U. S. P. X 34 units per gram are dissolved in 400 cc. of a 1:1 mixture of dry pyridine and benzol, and 105 grams of oleyl chloride are added. The mixture is heated on a water bath for one hour. The reaction mixture is then washed into a separatory funnel containing air-free distilled water. Pyridine is removed by washing with acid, and benzol is distilled off under reduced pressure. The residue consisting of the vitamin A oleic acid ester as well as a small quantity of vitamin A alcohol is taken up in a suitable solvent, such as methyl alcohol, and cooled to a low temperature to insure separation of the ester from the unchanged alcohol and other impurities.

Example 2

100 grams of vitamin A having 2,500,000 units per gram are dissolved in 250 cc. of pyridine, and 60 grams of mixed unsaturated acid halides obtained from linseed oil are added. The mixture is again heated on a water bath for one hour with occasional stirring, care being taken that air is excluded during the process. The pyridine is then removed in the usual manner and the esters separated from the remaining free alcohol and other accompanying impurities by freezing out.

Example 3

100 grams of vitamin A concentrate having 3,500,000 U. S. P. X 34 units per gram are dissolved in a suitable solvent, such as toluene or pyridine, and 90 grams of mixed higher unsaturated fatty acid anhydrides obtained from corn oil are added and the mixture heated under water bath for three hours, air being replaced by nitrogen. When using toluene or other solvent besides pyridine, the employment of a catalyst, i. e., para toluene sulfonic acid, may be advantageous. The solvent is removed in the usual manner and the esters precipitated from a suitable solvent at low temperatures.

The recovery of vitamin A by molecular distillation may be applied to any oil containing it. The animal oils particularly the marine animal oils, contain vitamin A in considerable amounts and form a convenient raw material for distillation. Examples of such oils are butter fat, cod-liver halibut, dogfish, haddock, burbot, coalfish, hake, pollock, body and liver oils, and seal and whale oils.

In the examples of esterification given other solvents than those listed such as benzine, xylene, etc., may be used, the essential requirements being that they have a vapor pressure sufficiently high to enable easy removal and be inert. While it is preferred to use such solvents in order to avoid local overheating, their use is unnecessary. Instead of pyridine other organic bases such as quinoline, picolines, lutidines, etc. may be used. Although the presence of such a base considerably improves the ease of esterification when employing acid halides their presence is not necessary.

The herein described invention constitutes a simple and highly efficient solution of the problem of avoiding loss in potency of vitamin A concentrates. The invention affords a convenient means for improving the utilization of vitamin A by the animal body. An especially desirable advantage of our invention is that antoxidants which are often of a toxic nature need not be employed to avoid loss in potency.

By the term molecular distillation as used in the claims, we intend to designate that type of distillation which has become known in the art by that name or by the name of evaporative distillation. See, for example, Hickman patents, 1,925,559 and 1,942,858, Burch, 1,955,321, Washburn, "Bureau of Standards Journal of Research," volume 2, 1929, pages 477–843 and Crowther "Journal of American Chemical Society," volume 54, 1932, pages 1557–1562. This type of distillation comprises using such a low pressure that the distilling molecules have an appreciable mean free path and condensing them upon a condensing surface located at a distance from the evaporating surface of less than about the mean free path of the distilling molecules.

We claim:

1. The process which comprises subjecting an animal oil containing vitamin A in the alcohol form to molecular distillation separating a distillate containing vitamin A in the alcohol form and esterifying the alcohol content of the distillate with an aliphatic acylating agent.

2. The process which comprises subjecting an animal oil containing vitamin A to molecular distillation at a pressure of less than .1 mm. at a temperature between 70° and 250° C., separating a distillate containing vitamin A and esterifying the alcohol content thereof with an aliphatic acetylating agent.

3. The process which comprises subjecting an animal oil containing vitamin A to molecular distillation at a pressure of less than .1 mm. at a temperature between 70° and 250° C., condensing a distillate containing vitamin A at a distance of less than the mean free path of the distilling molecules and esterifying the alcohol content thereof with an aliphatic unsaturated acylating agent.

4. The process which comprises subjecting an animal oil containing vitamin A to molecular distillation at a pressure of less than .1 mm. at a temperature between 70° and 250° C., separating a distillate containing vitamin A and esterifying the alcohol content thereof with an unsaturated aliphatic acylating agent forming an ester having at least 8 carbon atoms in the acyl radicle.

5. The process which comprises subjecting an animal oil containing vitamin A to molecular distillation at a pressure of less than .1 mm. at a temperature between 70° and 250° C., separating a distillate containing vitamin A and esterifying the alcohol content thereof with an unsaturated aliphatic compound selected from the group consisting of acid halides and anhydrides having at least 8 carbon atoms in the acyl radicle.

6. The process which comprises subjecting a fish oil containing vitamin A to molecular distillation at a pressure of less than .1 mm. at a temperature between 70° and 250° C., separating a distillate containing vitamin A and esterifying the alcohol content thereof with an unsaturated aliphatic acylating agent.

7. The process which comprises subjecting a fish oil containing vitamin A to molecular distillation at a pressure of less than about 0.1 mm. at a temperature between 70° and 250° C., condensing a distillate containing vitamin A at a distance of less than the mean free path and esterifying the alcohol content thereof with an unsaturated aliphatic acylating agent having at least 8 carbon atoms in the acyl radicle.

8. The process which comprises subjecting a vitamin A containing oil to molecular distillation, separating a vitamin A containing fraction, saponifying the ester content thereof and esterifying the alcohol produced with an unsaturated aliphatic acylating agent having at least 8 carbon atoms in the acyl radicle.

9. The process which comprises subjecting a concentrate of vitamin A containing the vitamin substantially in the alcohol form to esterification with an unsaturated aliphatic acylating agent.

10. The process which comprises esterifying vitamin A in the alcohol form with an unsaturated aliphatic acylating agent having at least 8 carbon atoms in the acyl radicle.

11. The process which comprises esterifying vitamin A in the alcohol form with a member of the group consisting of unsaturated aliphatic acid halides and anhydrides having at least 8 carbon atoms in the acyl radicle.

12. The process which comprises esterifying a vitamin A concentrate containing the vitamin substantially in the alcohol form by reacting with oleyl chloride.

13. The process which comprises esterifying a saponified vitamin A concentrate with an unsaturated aliphatic acylating agent.

14. The process which comprises esterifying a saponified vitamin A concentrate with an unsaturated aliphatic acylating agent having at least 8 carbon atoms in the acyl group.

15. A vitamin A ester of oleic acid.
16. A vitamin A ester of linoleic acid.
17. A vitamin A ester of linolenic acid.

KENNETH C. D. HICKMAN.
ARTHUR O. TISCHER.